US006402156B1

(12) United States Patent
Schutz et al.

(10) Patent No.: US 6,402,156 B1
(45) Date of Patent: Jun. 11, 2002

(54) GLASS-CERAMIC SEALS FOR CERAMIC MEMBRANE CHEMICAL REACTOR APPLICATION

(75) Inventors: James B. Schutz, Boulder; Thomas F. Barton, Longmont, both of CO (US)

(73) Assignee: Eltron Research, Inc., Boulder, CO (US)

(*) Notice: Subject to any disclaimer, the term of this patent is extended or adjusted under 35 U.S.C. 154(b) by 0 days.

(21) Appl. No.: 09/399,582

(22) Filed: Sep. 20, 1999

Related U.S. Application Data

(60) Provisional application No. 60/129,683, filed on Apr. 16, 1999.

(51) Int. Cl.$^7$ ................................................. F16J 15/14
(52) U.S. Cl. ..................... 277/316; 277/650; 277/943; 501/15; 501/55; 501/63; 501/64; 501/67; 501/71; 501/72
(58) Field of Search ................................. 277/314, 316, 277/628, 650, 924, 935, 939, 943; 501/14, 15, 18, 24, 26, 53, 55, 63–72

(56) References Cited

U.S. PATENT DOCUMENTS

| | | | |
|---|---|---|---|
| 2,392,314 A | | 1/1946 | Dalton .......................... 106/54 |
| 2,933,857 A | | 4/1960 | Stookey .......................... 49/77 |
| 3,220,815 A | | 11/1965 | McMillan et al. .............. 65/32 |
| 3,564,587 A | | 2/1971 | Ellis .............................. 161/193 |
| 3,957,496 A | * | 5/1976 | Eagan |
| 4,221,604 A | * | 9/1980 | Chirino et al. |
| 4,277,285 A | * | 7/1981 | Boudot et al. |
| 4,293,325 A | * | 10/1981 | Chirino et al. |
| 4,312,951 A | * | 1/1982 | Eppler |
| 4,349,635 A | * | 9/1982 | Davis et al. |
| 4,414,282 A | | 11/1983 | McCollister et al. ....... 428/433 |
| 5,029,242 A | * | 7/1991 | Sammet |
| 5,179,047 A | * | 1/1993 | Chiba |
| 5,525,855 A | * | 6/1996 | Gotoh et al. |
| 5,725,218 A | | 3/1998 | Maiya et al. |
| 5,750,279 A | | 5/1998 | Carolan et al. ................ 429/32 |
| 5,820,989 A | | 10/1998 | Reed et al. .................. 428/426 |
| 6,164,954 A | * | 12/2000 | Mortazavi et al. |
| 6,200,137 B1 | * | 3/2001 | Holand et al. |

FOREIGN PATENT DOCUMENTS

DE        1045056        11/1958

OTHER PUBLICATIONS

Berezhnoi, A.I. (1970), "Glass–Ceramics and Photo–Sitalls," Plenum Press, New York, Chapter IV, pp. 193–241 and Chapter V, pp. 316–412 and literature cited on pp. 413–437.
Partridge, G. and McMillan, P.W. (Dec. 1963), "The preparation and properties of glass–ceramics using metallic phosphates as nucleation catalysts," Glass Technol. 4(6):173–182.

* cited by examiner

*Primary Examiner*—Anthony Knight
*Assistant Examiner*—John L. Beres
(74) *Attorney, Agent, or Firm*—Greenlee, Winner and Sullivan, P.C.

(57) ABSTRACT

Glass-ceramic sealants for ceramic membrane reactors, ceramic membrane sealed to holders or substrates and methods of making seals between two ceramic materials or between a ceramic and a metal or metal alloy are provided. These sealants combine silicate glass-ceramic materials with selected metal oxides and, optionally, materials similar or identical to the materials being sealed, and employ thermal processing so that the resultant materials will have a thermal expansion coefficient that substantially matches the thermal expansion coefficients of the two materials. Surfaces of the ceramic sealant that are exposed to reactive atmospheres can be protected by providing a metal or metallic alloy layer over the ceramic seal.

48 Claims, 6 Drawing Sheets

GLASS-CERAMIC SEALS FOR CERAMIC MEMBRANE CHEMICAL REACTOR APPLICATION

CROSS-REFERENCE TO RELATED APPLICATIONS

This invention takes priority under 35 U.S.C. § 119(e) from U.S. Provisional application serial Number 60/129, 683, filed Apr. 16, 1999, which is incorporated in its entirety by reference herein to the extent not inconsistent herewith.

BACKGROUND OF THE INVENTION

Chemical reactors which are based upon dense ion-conducting ceramic membranes are used for processes including oxygen separation, controlled oxidation reactions, and fuel cell applications. For example, mixed ion/electron conducting ceramic membranes may be used to separate oxygen from air and transport oxygen anions to the opposing membrane surface where they can be recombined to form pure oxygen gas or can be used for catalytically-controlled oxidation of feedstock gases to form preferred oxidized product gases. Similarly, fuel cells may be based upon electrically-insulating oxygen anion-conducting or proton-conducting membranes.

Ceramic membrane reactors must be operated at elevated temperature in order to produce ion fluxes of sufficient magnitude for economically viable chemical reaction rates. Reactant gases are sometimes supplied to the ceramic membrane reactor at elevated pressure from prior chemical unit operations. It is also sometimes desirable for reaction products to be supplied at elevated pressure to increase the chemical driving force or to prevent expensive decompression/compression steps.

Operating conditions for ceramic membrane reactors can include pressures up to 600 psi and temperatures up to 1000° C. The ceramic membrane is substantially gas-impermeable and typically divides a reactor into an oxidation zone and a reduction zone. The reactor is typically formed by positioning the ceramic membrane and forming a gas-tight seal between the membrane and ceramic or metallic substrates of the reactor.

Practical chemical reactors based upon ceramic membranes must include structures to support the active ceramic membrane between reactant and product gases, to supply reactant gases, to remove product gases, and to isolate reactants from products. Depending upon the details of the reactor, these structures can include various metallic or ceramic membrane holders, manifolds and substrates. These reactors must reliably seal the active ion-conducting ceramic membrane to a holder or substrate in the reactor. Such seals must be gas-tight and able to sustain the operating conditions of the reactor, including the elevated temperatures and pressure gradients, without adversely affecting the active ceramic membrane. The seals must also be physically and chemically stable to provide reliable operation over the lifetime of the membrane, which is typically on the order of one to ten years. The seals must be substantially gas-impermeable and able to withstand exposure to strongly oxidizing and reducing atmospheres, including hydrocarbons, hydrogen, alcohols, $H_2S$, $NO_x$, water, oxygen, and air.

U.S. Pat. No. 2,933,857 relates to semicrystalline, high silica content ceramics with high thermal expansion coefficients which contain (by weight) 85–92% $SiO_2$, 6.5–15% $Na_2O$ and/or $K_2O$, 0–8% $Al_2O_3$, and 0–5% P where the combined amounts of $SiO_2$, $Na_2O$ and $K_2O$ are equal to at least 92%. The ceramic material is heated to between 650° C. and 1250° C. until it has a linear thermal expansion coefficient above $175 \times 10^{-7}$ [/° C.] between 0°C.–300° C. The ceramic is described as useful for tableware and for seals to high expansion metals and alloys.

U.S. Pat. No. 4,414,282 relates to glass ceramic seals to nickel-based alloys, such as Inconel. The seal is formed using a composition containing (by weight) 65–80% $SiO_2$, 1.5–7% $B_2O_3$, 1–8% $Al_2O_3$, 1–5% $P_2O_5$, 1–8% $K_2O$ and 8–16% $Li_2O$. The glass compositions are reported to be sufficiently well-matched to nickel-based alloys to be more resistant to internal cracks than prior art seals. This patent cites several earlier U.S. Pat. Nos. 2,392,314, 3,220,815 and 3,564,587 which relate to glass ceramic seals ($SiO_2$ in combination with $Li_2O$ and ZnO or more complex combinations, respectively). A related U.S. Pat. No. 5,820,989 provides a process for preparing a glass ceramic-to-metal seal by thermal processing of a formula very similar to that of the '282 patent.

U.S. Pat. No. 5,725,218 discloses strontium-borate compositions for use as ceramic membrane-metal alloy sealants in membrane reactors. The sealant composition includes prescribed amounts (about 30–70% by weight) of the metal oxide ceramic membrane material, a fritted compound of Sr, Fe and Co oxides.

SUMMARY OF THE INVENTION

The present invention relates generally to glass-ceramic sealants and to methods of making seals between a ceramic material and a substrate which may be another ceramic, metal or a metal alloy. Seals of the present invention employ silicate glass-ceramic materials combined with selected metal oxides and are thermally processed so that the resultant material will have a thermal expansion coefficient that preferably substantially matches or is intermediate between the coefficients of thermal expansion (CTE) of the two materials between which a seal is to be formed. Sealant materials of this invention are formulated to have thermal expansion coefficients under temperatures, pressures and other operating conditions in a given application, to minimize or avoid sealant joint fracture or to extend the lifetime of the joint under harsh operating conditions. Most generally, sealant materials of this invention can be formulated to have thermal expansion coefficients ranging from about $1 \times 10^{-6}$ [/° C.] to about $25 \times 10^{-6}$ [/° C.].

The sealants and sealing methods of this invention are particularly useful in forming seals between materials having relatively high thermal expansion coefficients, i.e., between about $5 \times 10^{-6}$ [/° C.] and about $25 \times 10^{-6}$ [/° C.] and more useful for forming seals between high thermal expansion materials (having CTE about $8 \times 10^{-6}$ [/° C.] or higher). The sealants, seals and sealing methods of this invention are generally useful in sealant applications for catalytic ceramic membranes and, more particularly, are useful in fabrication of ceramic membrane chemical reactors.

Preferred silicate glass-ceramic sealant components are selected so that the CTE of the resultant thermally-processed sealant material substantially matches or is intermediate between the CTE of a ceramic membrane and the ceramic, metal or metal alloy substrate to which the membrane is to be sealed. For applications in ceramic membrane reactors, the CTE of the sealant composition is preferably adjusted to substantially match or to be intermediate between the CTE of the ceramic membrane and its supporting substrates under reaction conditions such as: high temperature; the presence of potentially reactive, reducing, or oxidizing gases; potentially high pressures or pressure differentials across the membrane; or the presence of gases that may cause chemical expansion or contraction of the membrane (e.g., the presence of high or low concentrations of oxygen that may cause expansion or contraction, respectively, of the membrane material).

The sealant compositions of this invention may be heat-treated to produce crystalline phases resulting in the physical and chemical properties needed for production of seals having the desired thermal expansion it coefficients. Reliable seals can be obtained if the CTE of the sealant ceramic is intermediate between that of the ceramic membrane and the substrate. In preferred sealant joint assemblies (ceramic-sealant-substrate) the substrate is selected to have a CTE, under desired operating conditions, which is within about $5 \times 10^{-6}$ [/° C.] of that of the ceramic membrane to which it is to be joined. More preferably, the CTE of the substrate matches that of the ceramic membrane within about $1 \times 10^{-6}$ [/° C.]. In certain embodiments herein, the sealant is selected so that its CTE is intermediate between the ceramic and the substrate.

Reliable seals can also be attained when the sealant CTE is within about $1 \times 10^{-6}$ [/° C.] to about $5 \times 10^{-6}$ [/° C.] of the CTEs of the materials to be joined. Preferred seals are formed when the sealant CTE is within about $1 \times 10^{-6}$ [/° C.] of the CTEs of the materials to be joined.

Powders of the preferred silica-based sealant compositions are fabricated via conventional glass-making processes into amorphous powders. The amorphous powders may be used directly for seal formation or pressed into appropriate precursor shapes (rings, disks, etc.) to form seals between the ceramic membrane and the ceramic, metal or metal alloy substrate. Sealant powders can also be blended with organic binders to form a paste which is applied between the ceramic and substrate. The joint assembly is then heated to burn out organic binder and subjected to further heat treatment to form the sealant joint.

Sealant materials for use in joining ceramic and substrate materials with relatively high or high CTEs are preferably thermally processed to exhibit relatively high CTEs (under typical ceramic membrane reactor application conditions). Relatively high CTEs are in the range of about $5-25 \times 10^{-6}$ [/° C.]. These materials are more useful for sealing ceramic membranes and substrates with CTEs in the range of about $1-30 \times 10^{-6}$ [/° C.]. Formulation and thermal processing of sealant materials for these applications is selected to result in preferential growth of selective high expansion crystalline phases which exhibit relatively high CTEs. High expansion phases may include silica polymorphs of tridymite and cristobalite, as well as lithium silicates or other high-expansion phases.

The invention also includes silica glass ceramic sealant material having CTEs in the range of about $1 \times 10^{-6}$ [/° C.] to about $5 \times 10^{-6}$ [/° C.] which are more useful for sealing ceramic membranes and substrates with CTEs in the range of about $0.5 \times 10^{-6}$ [/° C.] to about $10 \times 10^{-6}$ [/° C.]. Formulation and thermal processing of sealant materials for this application is selected to result in preferential growth of selective low expansion crystalline phase which exhibit desired CTEs. Low expansion phases include lithium aluminum silicates such as spodumene.

In a preferred embodiment, to further aid in substantially matching the CTE of the seal to that of the membrane, sealants of this invention can optionally comprise up to about 80% by weight of the ceramic membrane material. The ceramic membrane material can be present for an amount from about 0.5% to about 80%. Ranges of ceramic membrane materials added with other sealant ingredients can be from about 25% to about 80% by weight, from about 50% to about 80% and from about 50% to about 75%. Preferred ceramic membrane materials are typically mixed metal oxides which exhibit selective ionic and/or electronic conductivity dependent upon the specific application. For applications in which oxygen anions are transported across the membrane, sealants comprising up to about 80% of an oxygen anion/electron-conducting mixed metal oxide material are preferred.

The CTEs of sealants can be predicted largely by interpolation of the coefficients of the components, weighted according to the volume fraction of each component present. Actual CTEs of a given sealant composition can then be measured by known methods. Preferably the CTE of the sealant is measured by known methods under the conditions of the application for which it is targeted.

In another embodiment, a metal or metallic alloy seal is provided on any exposed surface of a ceramic seal used to bond a ceramic membrane to a substrate or holder. The metal or metallic seal is particularly useful to prevent possible damage to ceramic seals on exposure to reactor atmospheres, e.g., oxygen-containing gases, gases to be oxidized and other potentially detrimental gases, including water vapor, passed into or through the ceramic membrane reactors. Furthermore, the metal or metallic alloy seal, particularly when applied to surfaces of ceramic seals of this invention, can serve to minimize or correct defects in seal porosity, e.g., by sealing cracks in the ceramic seal.

DETAILED DESCRIPTION OF THE INVENTION

The invention is further illustrated by the drawings in which the same numbers are used to refer to like features.

Figure 1:
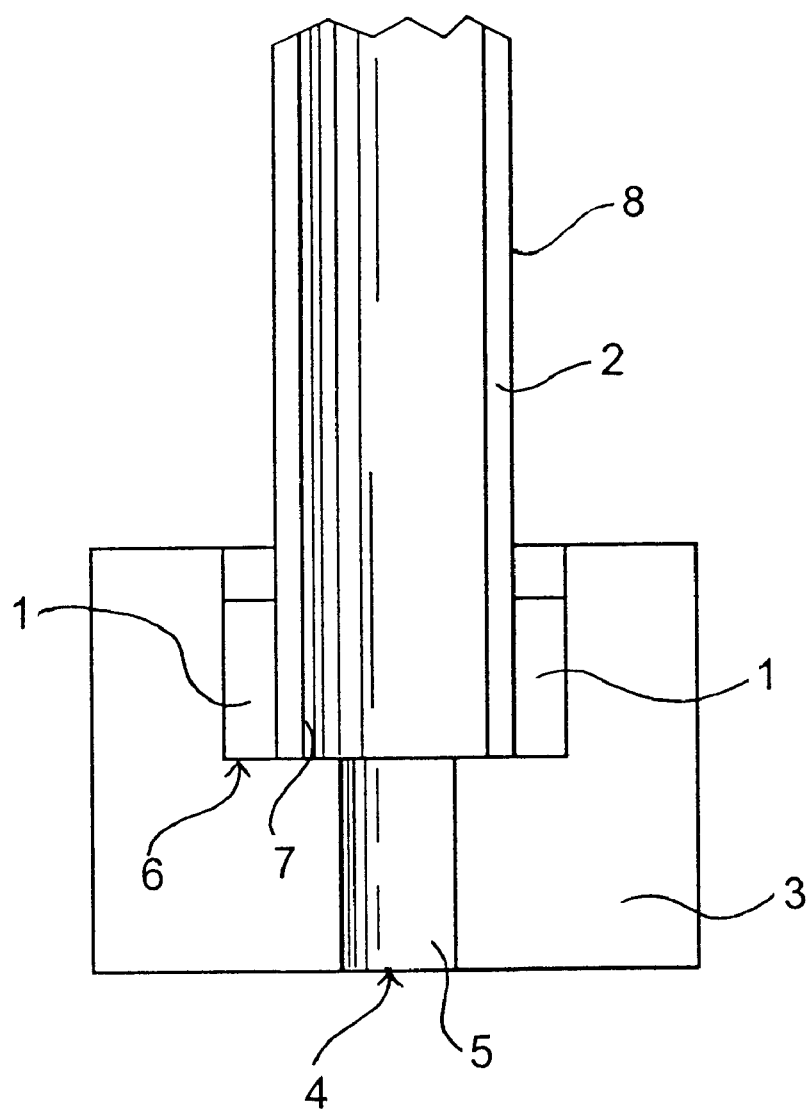
FIG. 1 is a schematic drawing of an exemplary seal formed between a tubular ceramic membrane and a substrate holder within a ceramic membrane reactor.

One embodiment of the sealant as used in a ceramic tubular membrane reactor is illustrated schematically in FIG. 1. The substrate or holder 3 may be machined from an oxidation resistant metallic alloy or from a ceramic material. The illustrated holder 3 is provided with an axial cavity 4 having a lower portion 5 and an upper portion 6 for access of a first reactant gas into the ceramic tube for contact with the inner surface 7 of the membrane. The first reactant gas may be supplied through an inlet tube (not shown) which extends through the axial holder cavity into the cavity within the ceramic membrane tube. The upper portion of that cavity 6 is shaped to receive a tubular ceramic membrane 2 which is aligned with the lower portion of the axial cavity 5. A seal 1 is formed between the inner walls of the upper portion of the cavity 6 and a portion of the outside surface 8 of the ceramic membrane 2. The ceramic membrane may be a one-end closed tube formed of ceramic where the open end is sealed as indicated in FIG. 1. Alternatively, the membrane may be an open-ended tube with both ends sealed as indicated in FIG. 1. The ceramic membrane sealed to the holder is typically positioned within a reactor chamber (not shown) and a flow of a second reactant gas is provided to the outside surface of the ceramic membrane 8. To form a gas-tight seal between the holder and the membrane, the ceramic membrane is inserted into the upper portion of the holder cavity 6, aligned with lower portion of the axial cavity 5 and metal oxide glass sealant powder is introduced into the upper portion of the cavity 6 around the membrane 2. The metal oxide sealant powder can be pressed to form a ring which fits closely between the holder and a portion of the outside surface of the ceramic membrane tube. The assembly is then processed at an elevated temperature, at which the sealant wets the ceramic membrane and the substrate materials and forms a fully dense non-porous seal 1. Subsequent heat treatment is employed to form fine crystalline nuclei within the glassy material of the seal. Further heat treatment is employed to grow crystallites from within the glassy phase, resulting in a material consisting primarily of these crystallites with only a small proportion of residual glassy phase. The presence of the crystalline phase is believed to result in enhanced mechanical properties at high temperature, reduced creep, physical and chemical stability, and thermal expansion properties which are tailored to the specific ceramic membrane reactor application.

In an alternative embodiment, the sealant powder is blended with an organic binder, such as polyvinyl butyral, polyvinyl alcohol, polymethyl methacrylate, or polyethylene glycol, in a sufficient amount to form a paste. This paste is then applied in the upper portion of the holder cavity 6 between the outside surface 8 of the ceramic membrane and the inner walls in the upper cavity of the holder. A moderate temperature heat treatment (e.g., between about 250° C. and 500° C.) is then employed to burn out the organic binder. Subsequent heat treatment, similar to that previously described, is applied to achieve wefting, crystallite nucleation and crystallite growth.

In a preferred reactor configuration using a closed-one-end tube membrane for oxidation/reduction reactions or oxygen separation, an oxygen-containing gas (e.g., air) is introduced into the axial holder cavity to contact the inside surface 7 of the ceramic membrane and a reduced gas to be oxidized, inert gas or other gas to be oxygen enriched is introduced in contact with the outside surface of the membrane 8.

Figure 2:
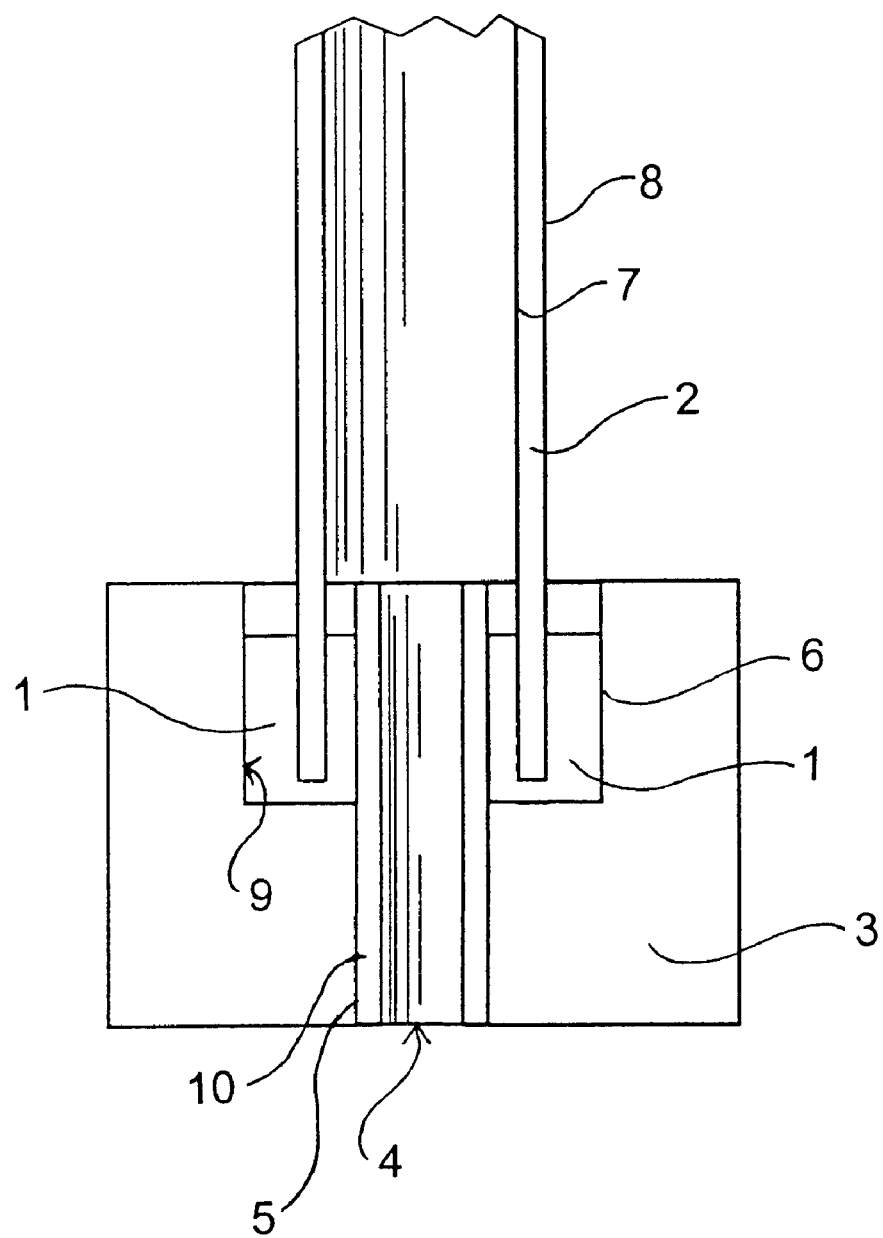
FIG. 2 is an alternate seal of FIG. 1 in which an inner tube extending from the substrate holder is provided to locate the ceramic membrane and contain the seal.

FIG. 2 illustrates an alternate ceramic membrane tube seal. In this case, the axial cavity of the holder 4 contains an alignment tube 10 that extends upward into the upper portion of the holder cavity and that facilitates alignment of the ceramic tube with the lower portion of the axial cavity 5. The outside diameter of the alignment tube 10 is less than the inside diameter of the ceramic membrane tube.

Preferably, the ceramic membrane walls do not directly contact the alignment tube walls. The seal is formed as discussed above, except that in this case, seal material may flow, or be positioned, in between the inner wall of the ceramic membrane and the outer wall of the alignment tube. The presence of seal material in the gap between the ceramic membrane and the alignment tube enhances the reliability of the ceramic seal.

FIG. 2 illustrates the case in which the seal at the inner membrane surface is the same height as the seal at the outer surface. The heights of the seals at the inner and outer membrane surfaces may be the same or different. In general, the height of the seal, determined generally by the depth of the upper portion of the cavity 6, and specifically by the amount of sealant material added to the upper portion of the holder cavity, can be adjusted to provide a gas-tight seal and provide the desired level of mechanical strength for a given holder material and geometry and a given ceramic membrane material and geometry, in view of the pressure, temperature and gas flow conditions for a given ceramic membrane reactor application.

In FIG. 2, the width of the seal is illustrated as thicker at the outer membrane surface than at the inner membrane surface. However, the relative width of the seals at these surfaces may be the same or different. In general, the width of the seals, determined by the relative diameters of the upper portion of the cavity, the ceramic membrane and any alignment tube, can be adjusted to provide a gas-tight seal and provide the desired level of mechanical strength for a given holder material and geometry and a given ceramic membrane material and geometry, in view of the pressure, temperature and gas flow conditions for a given ceramic membrane reactor application.

Figure 3:
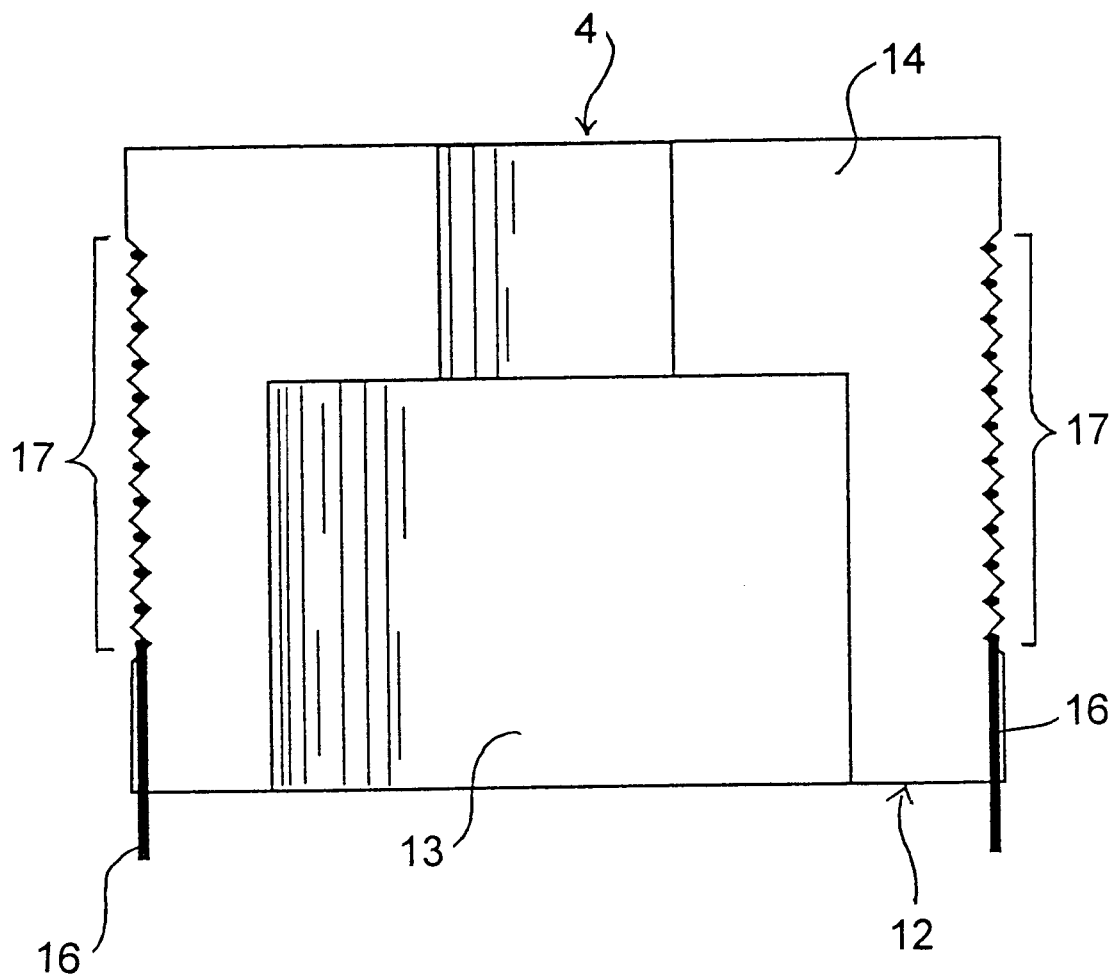
FIG. 3 is a schematic drawing of an exemplary substrate heater in which a heating element is provided to facilitate thermal processing of sealant material in situ within a ceramic membrane reactor.

FIG. 3 illustrates a sleeve heater 12 for use with membrane holder 3. The heater is a ceramic block 14 shaped to surround and closely fit holder 3. The block thus has an axial cavity 13 shaped to receive the holder 3. The exterior of the ceramic block is provided with a heating element 16, which can be a resistance wire, such as platinum resistance wire, through which a current is passed (current source not illustrated) to heat the block and thereby heat the holder, particularly the upper portion of the holder and the upper portion of the holder cavity. The heating element allows in situ heat treatment of the seal material within the holder to form the desired seals after the holder and the sleeve heater have been positioned in the membrane reactor. The heater block can be machined with a helical groove 17 around the exterior circumference of the block for receiving the resistance wire 16. Current supply and control can be provided to the heater from outside of the membrane reactor. A temperature sensor can also be provided at a surface of the heater (e.g., on the outside surface of the heater block or on the wall of the cavity 13) and in combination with a feedback control loop can be used for temperature control of the heater. This heater sleeve is particularly useful for in situ thermal treatment of the seal material within a ceramic reactor membrane.

Figure 4:
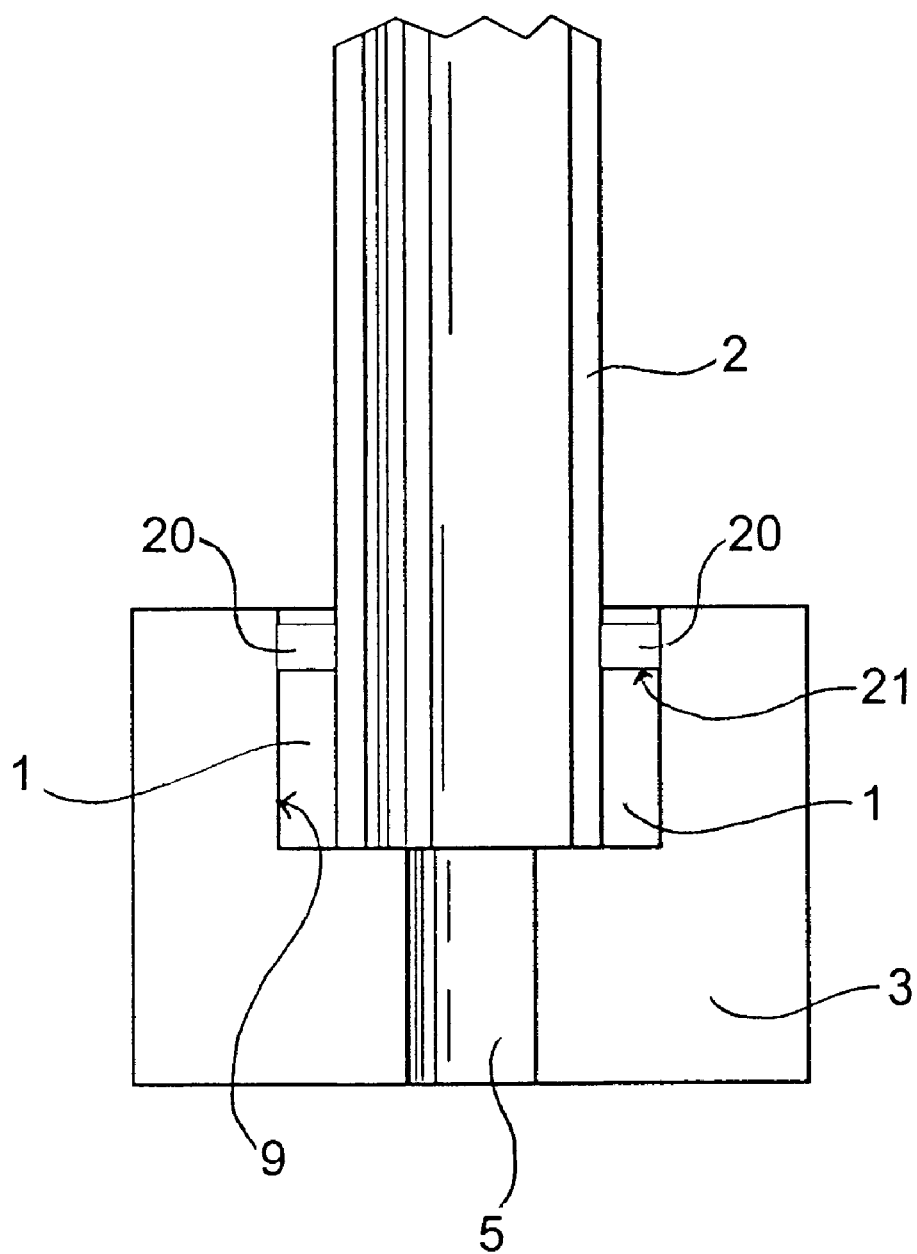
FIG. 4 is a schematic drawing of an exemplary seal of FIG. 1 in which a metal or a metallic alloy coating is applied at the seal surface in contact with reactive gases.

Some components of the ceramic seal material may be sensitive to and degraded by components of the reactor atmosphere (reactant or product gases) FIG. 4 illustrates an alternative seal in which a metal or metallic alloy coating layer 20 is applied to surfaces 21 of the ceramic seal that are or may be exposed to reactant or product gases during operation of the ceramic membrane in a ceramic membrane reactor. In the seals of FIGS. 1–2, the upper surfaces 23 of the seals 21 are exposed to reactant and product gases. FIG. 4 illustrates positioning of a metallic seal over the exposed surface of the ceramic seal at the outer membrane surface to protect the ceramic seal from possible degradation. The metallic seal is preferably a metallic alloy sealant applied with the ceramic sealant to isolate the ceramic seal from the reactor atmosphere. In seal of FIG. 4, an alloy is applied in the annular region between the ceramic membrane and the holder after thermal processing of the ceramic sealant to form the desired seal. The metal or metallic alloy may be applied to the ceramic seal surface as a wire, disk, powder or paste consisting of the alloy with an organic binder.

Any metal or metallic alloy with appropriate resistance to reactant and/or product gases and an appropriate melting temperature which is suitably higher than the desired operating temperature range of the ceramic membrane reactor can be employed to form the metallic seal. The melting temperature of the metal or metallic alloy used should be low enough to avoid damage to the ceramic membrane, any catalysts on the membrane surfaces, the ceramic seal and the reactor materials (e.g., the holder or substrate materials). Metallic alloys are preferred, in particular, alloys comprising gold, and more particularly alloys comprising gold and nickel. Other useful metallic alloys include gold-copper, copper-manganese, silver, nickel-palladium, and nickel-titanium alloys. Particularly useful alloys are those having about 10–20% by weight nickel and 90–80% by weight gold. A suitable metallic alloy seal has been formed using an alloy containing 81.95% gold and 18.05% nickel by weight, which has a melting temperature of 955° C. that is suitably higher than the 900° C. preferred maximum operating temperature of a ceramic membrane reactor for controlled oxidation reactions. Gold/Nickel alloys used in the method of this invention may contain up to about 10% by weight of other metal components including, e.g., Cu, Mn, Ag, V, Mo, Cr, Si, Fe, Pd, or Ti.

In a preferred embodiment, the seal assembly (after initial formation of the ceramic seal) is heated above the metal or alloy melting temperature (above the operating temperature of the reactor, at which point, the alloy melts and spreads out into a thin layer over the surface of the exposed surface of the ceramic seal. Upon cooling to the operating temperature of the reactor, the metal or metallic alloy solidifies and forms a protective barrier which isolates the ceramic seal material from the reactor atmosphere. The liquid metal or metal alloy will also tend to flow into pores, cracks, or crevices which may exist or appear in the ceramic seal. This treatment will close potential leak paths.

The metal or metallic alloy seal can also be made by introducing the metal or metallic alloy (wire, disk, plate, powder etc.) into the holder on top of the ceramic seal material before any heat treatment. Upon heating to the ceramic heat treatment temperature, the metal or metallic alloy will melt and remain liquid. At the conclusion of the ceramic heat treatment, the metal will solidify when the seal assembly is cooled to the application temperature to form the desired metal or metallic alloy coating. Preferred metals or metal alloys are inert such that the interaction between the metals and the ceramic are minimal during heat treatment.

The metal or metallic alloy in an organic binder may also be coated onto an exposed ceramic seal surface and thereafter heated to remove any binder and liquify the metal or metallic alloy. The desired metal or metallic alloy seal is formed on cooling the seal assembly.

Figure 5:
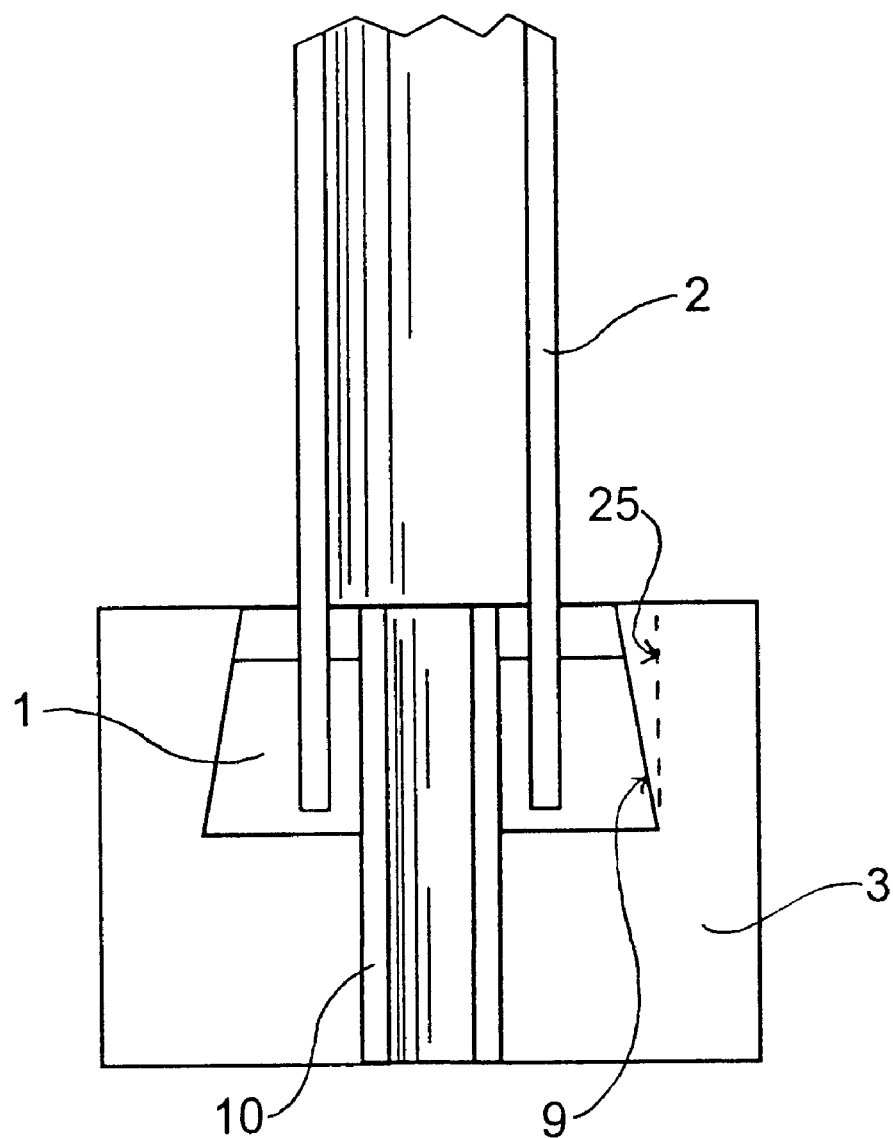
FIG. 5 is a schematic drawing of an exemplary seal, particularly for use with tubular ceramic membranes, in which the holder cavity into which the membrane is inserted for forming a seal has tapered walls. The use of tapered walls in the holder enhance the quality of the seals formed and control extrusion of the sealant material out of the holder cavity.

FIG. 5 is a schematic drawing of a preferred embodiment of a seal for a tubular ceramic membrane. This seal configuration can be employed with either an open-ended tube or a closed-one-end-tube. In this case, the walls 9 of the upper holder cavity that receives the ceramic membrane tube are tapered at an angle 25 with respect to the vertical. The walls taper inward at the top of the cavity. The use of tapered walls helps to keep seal material in place over time. Seal material may expand over time, the tapered walls help retain the seal material in the cavity. Further, the use of tapered walls improves the quality of the seal since as the seal material expands, force is directed inward and downward on the ceramic membrane tube. In preferred tapered walls, angle 25 ranges from about 5° to 20° from the vertical.

Sealants of this invention can be used in a variety of ceramic reactor membrane configurations and geometries. U.S. Pat. No. 5,750,279, for example, discloses a series planar oxygen pump having electrolytic cells comprising flat plates of oxygen-ion conducting solid electrolytes (i.e., ceramic membranes) sealed to substrates. The sealants disclosed in this patent are devitrifying glass and oxidation resistant metal braze alloy. The sealant materials and methods of the present invention can be applied for seals used in such solid electrolyte cells as illustrated in FIG. 6.

Figure 6:
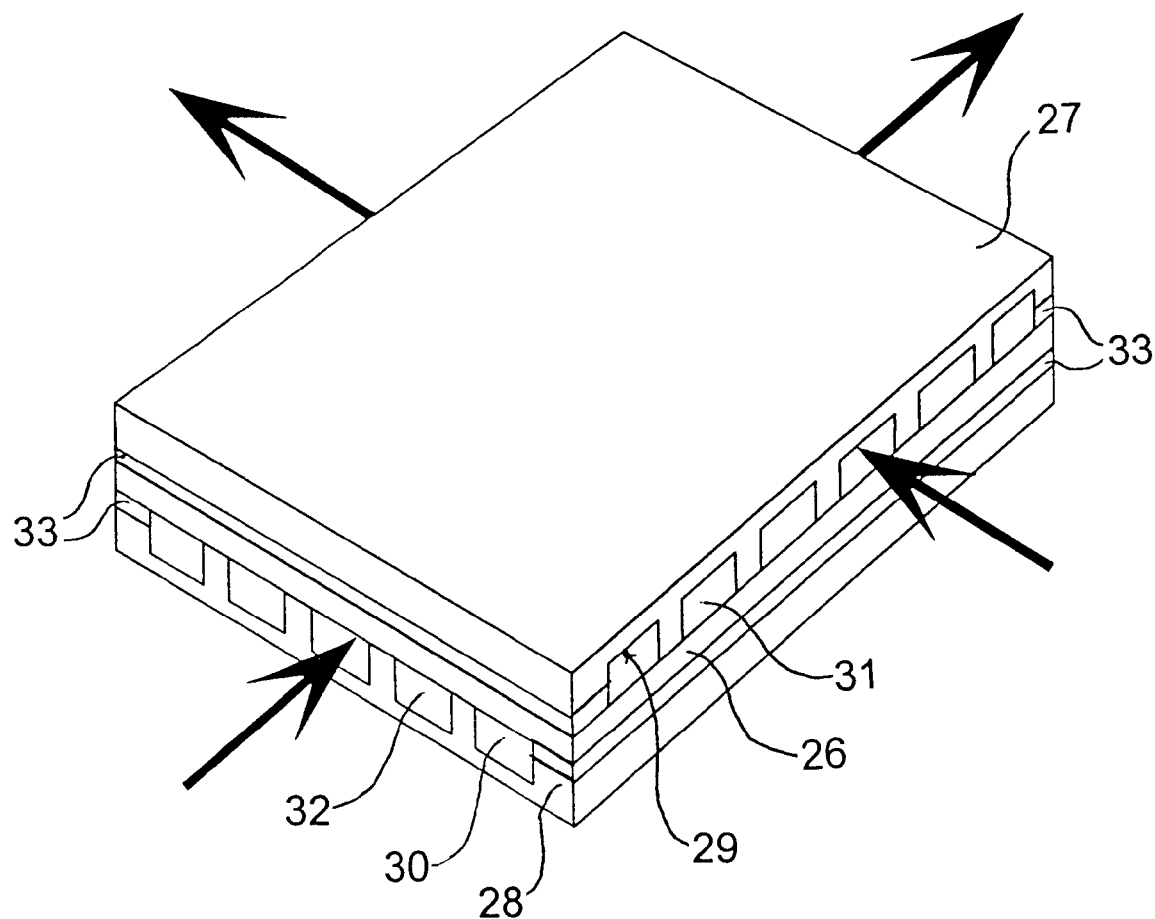
FIG. 6 is a schematic drawing of an exemplary seal formed between a flat ceramic membrane and a multiple-gas channel substrate holder within a ceramic membrane reactor.

FIG. 6 is a schematic drawing of an alternative ceramic membrane seal of this invention in which a ceramic membrane plate 26 is sandwiched between a top substrate 27 and a bottom substrate 28. The substrate is illustrated as a plate sized to substantially match the membrane plate. Both substrates carry a plurality of parallel grooves 29 and 30 extending across one of its surfaces. The substrates are positioned on either side (top and bottom, as illustrated) of the ceramic membrane. Seal material is introduced between the substrate and the ceramic membrane and heat treatment as described above to form desired gas tight seals is applied. Sealing the top substrate to the top side of the membrane forms a plurality of channels 31 in contact with the one side (top) of the membrane. Sealing the bottom substrate to the bottom side of the membrane forms a plurality of channels 32 in contact with the other side (bottom) of the membrane. The top and bottom channels are illustrated as extending perpendicular to each other across the membrane surface. In the illustrated reactor the substrates are sealed using a ceramic seal 33 to the ceramic membrane along two edges. No seal need be provided between the internal channels 31 and 32 formed between the membrane and the substrate. A metal or metallic alloy seal can be provided as described above on any ceramic sealant surface that is or may be exposed to reactant gases.

The reactor illustrated in FIG. 6 employing ceramic seals and metal or metallic alloy seals of this invention can be employed in all applications disclosed in U.S. Pat. No. 5,750,279 which patent is incorporated in its entirety by reference herein to the extent not inconsistent herewith.

Heating of holder/seal/ceramic membrane joint assembly is initially performed slowly at a rate of 1° C./minute to about 500° C. to decompose any organic binder present without disruption of the pressed seal preform. Heating may be performed at a faster rate if no binder is present or after all binder has been removed. The assembly is then heated to a temperature sufficient for the seal material to wet the holder and ceramic membrane. The temperature is then reduced and held for a sufficient time at the lower temperature to allow for the formation of fine crystallite nuclei. The temperature of the assembly is then raised and held for a sufficient time at the higher temperature to allow for the growth of the crystallites, resulting in a material which is substantially fully crystalline, with limited residual glassy phase. Substantially fully crystalline materials are about 90% or more crystalline. Preferred materials are 95% or more fully crystalline. Sealing, nucleation, and crystallite growth times and temperatures are specific to each material composition and to the desired crystalline phase. In some cases, the heating of the assembly to the sealing temperature, followed by cooling to application temperature is sufficient to fully crystallize the seal material due to heterogenous nucleation at particle surfaces and at ceramic and holder interfaces.

Sealing temperatures for each formulation are determined by the temperature at which the seal material satisfactorily wets the ceramic membrane material and the substrate or holder. Nucleation and crystallite growth time/temperature schedules for heat treatment of the sealant materials are selected using X-Ray Diffraction (XRD) and microscopic analysis to determine when the material produced is at least substantially fully crystalline in the desired crystalline phase with limited residual glassy phase (preferably about 95% or more crystalline). Sealing temperatures range from about 950° C. to 1350° C. Nucleation and crystallite growth temperatures range from about 960° C. to 1200° C., with heat treatment times up to about 24 hours.

In a preferred method, ceramic membrane reactor sealant materials are fabricated (i.e., components selected and mixed and the mixture heat treated) so that the chemical and thermal coefficients of expansion of the substrate, seal, and ceramic membrane materials substantially match to avoid seal fracture. The relative coefficients of expansion of the components of a sealed joint are a special concern when using oxygen ion-conducting membrane materials. Due to the ease of formation of oxygen vacancies in the crystalline lattice of the membrane materials, which is a necessary condition for the high oxygen diffusivity of these materials, there is a chemical expansion resulting from the changes in equilibrium oxygen content with temperature. This chemical expansion is superposed with the thermal expansion effects, resulting in a relatively large value of combined expansion coefficient as a function of temperature. Herein the terms "thermal expansion" and "coefficient of thermal expansion" or "CTE" are used broadly to include any concomitant material expansion with temperature that is due to chemical expansion under membrane operating conditions (including gases to which the membrane seal and substrate are exposed). The extent of any chemical expansion will depend upon the specific gases and pressures of gases to which the membrane (sealant and substrate) is exposed. From ambient temperature to about 1000° C., the combined coefficient of expansion (chemical and pure thermal effects) in typical reactive membranes is about 10 to about $20 \times 10^{-6}$ [/° C.]. High expansion ceramics or metallic alloys such as alumina, aluminosilicates, Incoloy 800, Inconel 600, or Haynes 230 can be used as substrates or holder materials.

The coefficient of thermal expansion of the sealing material depends upon the CTE of the component phases present. More specifically, the CTE of the material is determined largely by a volume fraction rule of mixtures of the CTE of the individual component phases. For applications to ceramic membranes with high $O_2$ flux and which have high CTEs ($8 \times 10^{-6}$ [/° C.] or greater), sealant material compositions and heat treatment schedules are selected which result in phases exhibiting large values of CTE, such as silica polymorphs of tridymite and cristobalite, and lithium silicates. For applications to ceramic membranes with lower CTE (1 to $5 \times 10^{-6}$ [/° C.]), sealant material compositions and heat treatment schedules are selected which result in phases exhibiting lower CTE values, such as lithium aluminum silicates, including spodumene. Preferred CTE values may be produced by altering the composition to produce the desired phases, as well as by addition of the ceramic membrane materials to the sealant and by varying temperature treatment to obtain desired crystalline phases.

The term "substantially match," when used in regard to selection of materials for forming seals and joints, means that the CTEs of the materials that are components of the joint formed, i.e., the sealant, membrane and substrate material, are sufficiently matched to avoid excessive mechanical stress at the joint and avoid fracture at the joint. Expansion coefficients are preferably matched to within about 1 to $5 \times 10^{-6}$ [/° C.] and are more preferably matched to within about $1 \times 10^{-6}$ [/° C.].

The present invention comprises sealant materials for ceramic membrane chemical reactor applications based on silicate glass ceramics, i.e, comprising about 40% to about 85% $SiO_2$ by weight. Sealants include two or more additional metal oxide materials: aluminum oxide, transition metal oxides (such as titanium oxide, cobalt oxide, zinc oxide, and zirconium oxide), lithium, sodium, boron or potassium oxide, calcium or magnesium oxide and a phosphorous oxide (e.g., phosphorous pentoxide) in order to produce the desired physical and chemical properties. Preferred sealant materials combine three or more metal oxide additives with $SiO_2$. Preferred sealant materials include those comprising aluminum and titanium oxide in combination with $SiO_2$ and a third metal oxide.

Sealant materials for use with lower CTE ceramic membranes and substrates (about $1-5 \times 10^{-6}$ [/° C.]) preferably contain about 40%–85% $SiO_2$ by weight in combination with aluminum, titanium, calcium and/or lithium oxides.

Sealant materials for higher CTE ceramic membranes and substrates (above about $5 \times 10^{-6}$ [/° C.]) preferably contain about 40%–85% $SiO_2$ by weight in combination with aluminum, titanium, zinc and/or cobalt. Maximum and preferred minimum compositions for preferred component metal oxides are:

| Component | Maximum Composition (by weight) | Preferred Minimum if Present (by weight) |
|---|---|---|
| $Al_2O_3$ | about 25% | about 0.25% |
| CoO | about 25% | about 0.25% |
| $Na_2O$ | about 10% | about 0.10% |
| CaO | about 10% | about 0.10% |
| MgO | about 20% | about 0.20% |
| ZnO | about 35% | about 0.35% |
| $TiO_2$ | about 10% | about 0.10% |

| Component | Maximum Composition (by weight) | Preferred Minimum if Present (by weight) |
|---|---|---|
| $Li_2O$ | about 30% | about 0.30% |
| $K_2O$ | about 10% | about 0.10% |
| $P_2O_5$ | about 10% | about 0.10% |
| $ZrO_2$ | about 5% | about 0.05% |
| $B_2O_3$ | about 5% | about 0.05% |

Useful sealant compositions include those which comprise a combination of $SrO_2$, $Al_2O_3$, $TiO_2$ and one or more transition metal oxides, including, for example, ZnO, CoO or mixtures thereof.

Useful sealant compositions include those which comprise (by weight) about 40%–85% $SiO_2$ with about 0.25% to about 25% $Al_2O_3$, and two or more transition metal oxides, e.g., about 0.1% to about 10% $TiO_2$ and about 0.35% to about 35% ZnO or about 0.1% to about 10% $TiO_2$ and about 0.25% to about 25% CoO. Specific compositions comprise from about 40%–60% $SiO_2$, about 10% to about 25% $Al_2O_3$, about 1% to about 10% TiO$_2$, and either about 20% to about 35% ZnO or about 15% to about 25% CoO. More specific sealant compositions comprise (by weight) from about 40%–50% SiO$_2$, 14–25% Al$_2$O$_3$, about 2%–10% TiO$_2$ and either about 30%–35% ZnO or about 20%–25% CoO.

The glass-ceramic compositions preferably also include up to about 80% by weight (and more preferably about 50%–80% by weight) of one or more mixed metal oxide ceramic membrane materials. Mixed metal oxides are preferably mixed ion and electron-conducting materials. Membrane material additives that are preferred for a given sealant application are the materials from which the membrane that is to be sealed is formed. Preferred materials include members of the formula:

$$A_xA'_{x'}B_yB'_{y'}O_{5+z}$$

where A is a lanthanide metal which includes: the lanthanides and yttrium, e.g., La, Ce, Pr, Nd, Pm, Sm, Eu, Gd, Tb, Dy, Ho, Er, Tm, Yb, Lu and Yt, or mixtures thereof;

A' is a Group metal (or Group 2b element) of the Periodic Table;

B is an element selected from the group consisting of Al, Ga, In, or mixtures thereof; and B' is a d block transition metal, Mg, or mixture of such elements;

y,y', x and x'$\geq$0; x+x'=2 y+y'=2 and z is a number that makes the material charge neutral.

The lanthanide metals include the f block lanthanide metals: La, Ce, Pr, Nd, Pm, Sm, Eu, Gd, Tb, Dy, Ho, Er, Tm, Yb, and Lu. Yffrium has properties similar to the f block lanthanide metals and is also included herein in the definition of lanthanide metals. For oxygen ion transport, A is preferably La or Gd, with La more preferred. Group 2 metal elements of the Periodic Table (also designated Group 2a) are Be, Mg, Ca, Sr, Ba, and Ra. The preferred A' elements for oxygen ion transport are Ca, Sr, and Ba, and Sr is most preferred. The more preferred B elements are Ga and Al, with Ga more preferred. The d block transition elements include Sc, Ti, V, Cr, Mn, Fe, Co, Ni, Cu, and Zn. Preferred B' elements for oxygen ion transport are Mg, Fe and Co, and mixtures thereof, with Fe and Co and mixtures thereof being more preferred. Mixed metal oxides in which B' is a mixture of Fe and Co are particularly preferred in sealant compositions for sealing membranes having high oxygen flux rates to substrate materials in reactors.

The value of z in the above formula depends upon the values of x, x', y and y' and the oxidation states of the A, A', B, and B' elements. The value of z is such that the mixed metal oxide material is charge neutral. In preferred materials, 0<z<1.

In more preferred embodiments, the mixed ion and electron conducting metal oxide has the formula $A_xA'_{x'}B_yB'_{y'}O_{5+z}$ where:

A=La, Ce, Gd, or mixtures thereof;

A'=Ca, Sr, Ba, or mixtures thereof;

B=Al, Ga, In, or mixtures thereof;

B'=Mg, Fe, Co, or mixtures thereof;

y,y',x,x'>0;

x+x'=2;

y+y'=2; and z is a number that gives charge neutrality (z is typically between 0 and 1).

Specific mixed conducting (ion and electron) materials that are useful as sealant components include:

$La_{0.3}Sr_{1.7}Ga_{0.6}Fe_{1.4-m}Co_mO_{5+z}$ where m is 0, 0.1, 0.15, 0.20, 0.25, 0.30, 0.35, and 0.40;

$La_{0.4}Sr_{1.6}Ga_{0.6}Fe_{1.4-m}Co_mO_{5+z}$ where m is 0, 0.1, 0.15, 0.20, 0.25, 0.30, 0.35, and 0.40;

$La_{0.3}Sr_{1.7}Al_{0.6}Fe_{1.4-m}Co_mO_{5+z}$ where m is 0, 0.1, 0.15, 0.20, 0.25, 0.30, 0.35, and 0.40; and $La_{0.4}Sr_{1.6}Al_{0.6}Fe_{1.4-m}Co_mO_{5+z}$ where m is 0, 0.1, 0.15, 0.20, 0.25, 0.30, 0.35, and 0.40.

Metal or metallic alloy coatings can be applied to surfaces of the ceramic seal that are exposed (or may be exposed) to reactor atmospheres. These coatings are not applied where they may disrupt the formation of the ceramic seal between the substrate or holder and the ceramic membrane, however the coating may extend to surfaces of the ceramic membrane or the substrate or holder, but not to an extent that the function of either is detrimentally effected. The metal or metallic alloy can be applied in a formed shaped to the ceramic surface to which the coating is to be applied, e.g., a ring or shaped wire of metal or metallic alloy can be applied in contact with the ceramic seal surface. The metal or metallic alloy placed on the ceramic surface is melted by application of heat, for example using the heater of FIG. 3, and as the surface and metal or metallic alloy is cooled a coating is formed on the surface. The amount of metal or metallic alloy initially applied to the surface is preferably sufficient to at least form a coating over the entire exposed surface of the ceramic seal. Alternatively, the metal or metal alloy can be applied as a mixture with an organic binder, e.g., by which is removed on heating, allowing the metal or metallic alloy coating to form on the desired surfaces.

The metal or metallic alloy coating can be relatively thin. The coating should preferably be sufficiently thick to provide the desired protection to the ceramic seal for a reasonable reactor lifetime, preferably weeks or months. Preferred thicknesses of the metal or metallic alloy coating range from about twenty thousandths of an inch to about one eighth of an inch.

The following examples are provided to illustrate the invention and are in no way intended to limit the invention.

EXAMPLES

Example 1

An amorphous powder containing 48.5 wt. % SiO$_2$, 14.6 wt. % Al$_2$O$_3$, 2.9 wt. % TiO$_2$, and 34.0 wt. % ZnO was isostatically pressed to form a tube. Segments of this tube were heated to 1200° C. to produce a glass-ceramic body. Heating was continued until examination by X-Ray Diffraction (XRD) revealed a crystalline microstructure. The coefficient of thermal expansion of the tube was measured as 9.4×10$^{-6}$ [/° C.] over the temperature range from ambient to 800° C. The material successfully wet an alumina substrate. The softening point was in excess of 1000° C. and the material was suitable for use as a seal for a ceramic membrane reactor with an operating temperature up to at least about 1000° C. Metal oxide starting materials were obtained from commercial sources and used without further purification. Metal oxides can be purified prior to mixing to remove volatile impurities (e.g., water) as is known in the art, if desired.

Example 2

An amorphous powder containing 45.5 wt.% SiO$_2$, 22.7 wt.% Al$_2$O$_3$, 9.1 wt. % TiO$_2$, and 22.7 wt. % CoO was prepared by conventional glass-making techniques. This powder was blended with a mixed oxygen anion/electron conducting ceramic powder. Proportions were 25 parts by weight amorphous powder to 75 parts by weight mixed conducting ceramic powder. The mixed conducting ceramic powder used was $La_{0.3}Sr_{1.7}Al_{0.6}Fe_{1.4}O_{5+z}$.

This blend was isostatically pressed to form a tube. Segments of this tube were heated to 1100° C. to produce a glass-ceramic body. Heating was continued until examination by XRD (X-ray Diffraction) revealed a crystalline microstructure. The CTE of the tube was measured as $10.4 \times 10^{-6}$ [/° C.] over the range from ambient to 950° C. The material successfully wet an alumina substrate. The softening point was in excess of 1000° C. and the material was suitable for use as a seal for a ceramic membrane reactor with an operating temperature up to at least about 1000° C.

Metal oxide starting materials were obtained from commercial sources and used without further purification. Metal oxides can be purified prior to mixing to remove volatile impurities (e.g., water) as is known in the art, if desired.

Those of ordinary skill in the art will appreciate that starting materials, methods, membranes (sizes, shapes and materials), and substrates (sizes, shapes and materials) other than those specifically disclosed can be employed to practice this invention. For example, ceramic membrane have been illustrated as tubular and flat plates. The sealant material and methods of forming seals of this invention can be used with a variety of other shapes of membranes. All such variants that are known in the art and that can be employed or adapted without undue experimentation to practice this invention are encompassed by this invention.

We claim:

1. A sealant composition comprising a mixture by weight of about 40% to about 85% $SiO_2$ and three or more metal oxides selected from the group aluminum oxide, cobalt oxide, sodium oxide, boron oxide, calcium oxide, magnesium oxide, zinc oxide, titanium oxide, lithium oxide, potassium oxide, phosphorous oxide and zirconium oxide combined with 0.5% to about 80% by weight of a ceramic membrane material wherein the ceramic membrane material is an ionic or electronic conductor material of the formula:

$$A_xA'_{x'}B_yB'_{y'}O_{5+z}$$

where: A is a lanthanide metal which includes: the lanthanides and yttriun, e.g., La, Ce, Pr, Nd, Pm, Sm, Eu, Gd, Th, Dy, Ho, Rr, Tm, Yb, Lu and Yt, or mixtures thereof;

A' is a Group 2b element of the Periodic Table;

B is an element selected from the group consisting of Al, Ga, In, or mixtures thereof; and B' is a d block transition metal, Mg, or mixture of such elements;

y,y', x and x'0; x+x'=2 y+y'=2 and z is a number that makes the material charge neutral.

2. The sealant of claim 1 which comprises about 40% to about 85% $SiO_2$, metal oxides of aluminum and titanium and a third metal oxide.

3. The sealant of claim 1 which is a mixture of about 40% to about 85% $SiO_2$, about 0.25% to about 25% $Al_2O_3$, about 0.05% to about 5% $TiO_2$, and about 3.5% to about 35% ZnO.

4. The sealant of claim 1 in which the mixture further comprises lithium, sodium or potassium oxide.

5. The sealant of claim 1 in which the mixture further comprises phosphorous pentoxide.

6. The sealant of claim 1 in which the mixture further comprises calcium oxide or magnesium oxide.

7. The sealant of claim 1 in which the mixture further comprises cobalt oxide or zirconium oxide.

8. The sealant of claim 1 which comprises from about 50% to about 80% by weight of a ceramic membrane material.

9. A sealant composition of claim 1 for forming a seal between high expansion coefficient materials.

10. A sealant composition made by combining 40% to about 85% of $SiO_2$ with three or more metal oxides selected from the group of metal oxides of aluminum, cobalt, sodium, calcium, magnesium, zinc, titanium, lithium, potassium, phosphorous, and zirconiumn with about 0.5% to about 80% by weight of a ceramic membrane material that is an ionic or electronic conductor material of the formula:

$$A_xA'_{x'}B_yB'_{y'}O_{5+z}$$

where: A is a lanthanide metal which includes: the lanthanides and yttrium, e.g., La, Ce, Pr, Nd, ?m, Sm, Bu, Gd, Tb, Dy, Ho, Er, Tm, Yb, Lu and Yt, or mixtures thereof;

A' is a Group 2b element of the Periodic Table;

B is an element selected from the group consisting of Al, Ga, In, or mixtures thereof, and B' is a d block transition metal, Mg, or mixture of such elements;

y,y', x and x'0; x+x'=2 y+y'=2 and z is a number that makes the material charge neutral, and subjecting the mixture to temperatures between about 960° C. to 1200° C. for up to about 24 hours.

11. The sealant of claim 1 which has a thermal expansion coefficient between about $1 \times 10^{-6}$ [/° C.] and about $25 \times 10^{-6}$ [/° C.].

12. A method for forming a seal between a ceramic membrane and a ceramic, metal or metal alloy substrate which comprises the steps of:

providing a sealant as in claim 1;

contacting the sealant with the ceramic membrane and the substrate; and heating the sealant to a sufficiently high temperature to form a substantially gas-impermeable seal between the membrane and the substrate.

13. A method of claim 12 wherein said heating step comprises:

contacting the sealant with the ceramic membrane and the substrate materials;

heating the sealant to a sufficiently high temperature to wet the surface of the two materials; and additionally heating at a higher temperature to form a substantially gas-impermeable seal between the two materials.

14. The method of claim 12 further comprising the steps of mixing said sealant with an organic binder to form a paste and wherein said heating step comprises:

heating the sealant to a moderately high temperature to burn out the binder; and heating the sealant to a higher temperature to form a substantially gas-impermeable seal.

15. The method of claim 14 further comprising the steps of:

mixing said sealant with an organic binder and pressing to form a sealant preform in the shape of a disk or tube;

contacting the sealant preform with the ceramic membrane and the substrate.

16. The method of claim 12 wherein the ceramic membrane and the substrate are both high expansion coefficient materials.

17. The method of claim 12 wherein the sealant has a coefficient of thermal expansion that substantially matches that of the ceramic membrane and substrate.

18. The method of claim 12 wherein the sealant has a coefficient of thermal expansion intermediate between that of the ceramic membrane and the substrate.

19. A method for forming a seal between a ceramic membrane and a ceramic, metal or metal alloy substrate which comprises the steps of:
providing a sealant composition comprising a mixture by weight of about 40% to about 80% $SiO_2$ and three or more metal oxides selected from the group consisting of aluminum oxide, cobalt oxide, sodium oxide, boron oxide, calcium oxide, magnesium oxide, zinc oxide, titanium oxide, lithium oxide, potassium oxide, phosphorus oxide and zirconium oxide;
contacting the sealant with a ceramic membrane and the substrate;
heating the sealant to a sufficiently high temperature to form a substantially gas-impermeable seal between the membrane and the substrate; and
providing a metal or metallic alloy layer on surfaces of the seal.

20. The method of claim 19 wherein a metallic alloy layer is provided on surfaces of the seal.

21. The method of claim 20 wherein the metallic alloy is an alloy of nickel and gold.

22. The method of claim 19 wherein the metal or metallic alloy layer is formed by introducing a metal or a metallic alloy in contact with a seal surface and thereafter raising the temperature of the temperature of the seal and the metal or metallic alloy to melt the metal or metallic alloy to form a layer on the seal surface.

23. The method of claim 22 wherein the metal or metallic alloy brought in contact with the seal surface is carried in an organic binder and coated onto the seal surface.

24. A gas-impermeable seal formed between a ceramic membrane and a substrate or holder wherein the seal is formed using a sealant of claim 1.

25. A gas-impermeable seal formed between a ceramic membrane and a substrate or holder wherein the seal is formed using a sealant composition comprising a mixture by weight of about 40% to about 85% $SiO_2$ and three or more metal oxides selected from the group aluminum oxide, cobalt oxide, sodium oxide, boron oxide, calcium oxide, magnesium oxide, zinc oxide, titanium oxide, lithium oxide, potassium oxide, phosphorous oxide and zirconium oxide wherein the surfaces of the gas impermeable seal that are not in contact with the ceramic membrane, the substrate or the holder are coated with a metal or metallic alloy.

26. A seal assembly for a ceramic membrane in a catalytic ceramic membrane reactor which comprises a membrane holder, a ceramic membrane and a gas-impermeable seal formed there between wherein the seal is formed from a sealant material of claim 1.

27. The seal assembly of claim 26 wherein the ceramic membrane is tubular.

28. The seal assembly of claim 27 wherein the seal is formed between the outside wall of the ceramic membrane tube and the substrate or holder.

29. The seal assembly of claim 26 wherein the ceramic membrane is a flat plate.

30. The seal assembly of claim 27 herein the substrate or holder comprises a cavity for receiving the ceramic membrane tube and the seal is formed between the outside wall of the tube and the inside walls of the cavity in the substrate or holder.

31. A seal assembly for a ceramic membrane in a catalytic ceramic membrane reactor which comprises:
a tubular ceramic membrane,
a membrane holder having a cavity with walls that taper for receiving the ceramic membrane tube; and
a glass impermeable seal formed between the outside wall of the ceramic membrane tube and the membrane holder
wherein the seal is formed from a sealant comprising a mixture by weight of about 40% to about 80% $SiO_2$ and three or more metal oxides selected from the group consisting of aluminum oxide, cobalt oxide, sodium oxide, boron oxide, calcium oxide, magnesium oxide, zinc oxide, titanium oxide, lithiumn oxide, potassium oxide, phosphorus oxide and zirconium oxide.

32. The sealant of claim 1 wherein:
A is La, Ce, Gd, or mixtures thereof,
A' is Ca, Sr, Ba, or mixtures thereof;
B is Al, Ga, In, or mixtures thereof; and
B' is Mg, Fe, Co or mitres thereof.

33. The sealant of claim 1 wherein B' is Fe.

34. The sealant of claim 1 wherein B' is CO.

35. The sealant of claim 1 wherein A is La.

36. The sealant of claim 1 wherein A is La and A' is Sr.

37. The sealant of claim 1 wherein A is La, A' is Sr, and B is Ga.

38. The sealant of claim 37 wherein B' is Ma, Fe, Co or mixtures thereof.

39. The sealant of claim 1 wherein A is La, Ce, Gd or mixtures thereof and B' is Mg, Fe, Co or mixtures thereof.

40. The sealant of claim 1 wherein the three or more metal oxides are aluminum oxide titanium oxide and zinc oxide.

41. The sealant of claim 1 wherein the three or more metal oxides are aluminum oxide, titanium oxide and cobalt oxide.

42. The method of claim 12 wherein the sealant comprises from about 50% to about 80% by weight of the ceramic membrane material.

43. The gas-impermeable seal of claim 25 wherein the surfaces of the seal not in contact with the ceramic membrane, the substrate or the holder are coated with a metallic alloy.

44. The gas-impermeable seal of claim 36 wherein the metallic alloy is an alloy of nickel and gold.

45. The seal assembly of claim 31 wherein the sealant further comprises from about 0.5% to about 80% by weight of a ceramic membrane material.

46. The seal assembly of claim 36 wherein the sealants further comprises from about 50% to about 80% by weight of a ceramic membrane material.

47. The seal assembly of claim 38 wherein the ceramic membrane material is an ionic or electronic conductor.

48. The seal assembly of claim 38 wherein the ceramic membrane material is an ionic or electronic conductor material of the formula:

$$A_xA'_{x'}B_yB'_{y'}O_{5+z}$$

where A is a lanthanide metal selected from the group consisting of La, Ce, Pr, Nd, Pm, Sm, Eu, Gd, Th, Dy, Ho, Er, Tm, Yb, Lu, Yt and mixtures thereof;
A' is a Group 2b element of the Periodic Table or mixtures thereof;

B is an element selected from the group consisting of Al, Qa, In, and mixtures thereof;

B' is a d block transition metal, Mg, or a mixture thereof; and y, y', x and x'$\geq$0; x+x'=2; y+y'=2 and z is a number that makes the ceramic membrane material charge neutral.

* * * * *

UNITED STATES PATENT AND TRADEMARK OFFICE
CERTIFICATE OF CORRECTION

PATENT NO. : 6,402,156 B1
DATED : June 11, 2002
INVENTOR(S) : Schutz et al.

It is certified that error appears in the above-identified patent and that said Letters Patent is hereby corrected as shown below:

<u>Title page,</u>
Item [57], ABSTRACT,
Line 2, please replace "membrane" with -- membranes --.

<u>Column 3,</u>
Line 10, please delete "it" following "expansion".
Line 60, please replace "phase" with -- phases --.

<u>Column 6,</u>
Line 64, please delete "23" following "surfaces".

<u>Column 8,</u>
Line 1, please replace "25" with -- 25 --.
Line 9, please replace "25" with -- 25 --.

<u>Column 12,</u>
Line 20, please replace "formed" with -- form --.

<u>Column 13,</u>
Line 26, please replace "membrane" with -- membranes --.
Line 47, please replace "Th" with -- Tb -- and "Rr" with -- Er --.
Line 55, please replace "y,y', x and x'0" with -- y, y', x and x' $\geq$ 0 --.
Line 61, please replace "amixture" with -- a mixture --.

<u>Column 14,</u>
Line 21, please replace "?m" with -- Pm -- and "Bu" with -- Eu --.
Line 29, please replace "y,y', x and x'0" with -- y, y', x and x' $\geq$ 0 --.

<u>Column 15,</u>
Line 35, please delete "temperature of the" following "temperature of the".

UNITED STATES PATENT AND TRADEMARK OFFICE
CERTIFICATE OF CORRECTION

PATENT NO.   : 6,402,156 B1
DATED        : June 11, 2002
INVENTOR(S)  : Schutz et al.

It is certified that error appears in the above-identified patent and that said Letters Patent is hereby corrected as shown below:

Column 16,
Line 1, please replace "herein" with -- wherein --.
Line 28, please replace "CO" with -- Co --.
Line 33, please replace "Ma" with -- Mg --.
Line 53, please replace "36" with -- 31 --.
Line 53, please replace "sealants" with -- sealant --.
Line 64, please replace "Th" with -- Tb --.

Column 17,
Line 2, please replace "Qa" with -- Ga --.

Signed and Sealed this

Twelfth Day of November, 2002

*Attest:*

*Attesting Officer*

JAMES E. ROGAN
*Director of the United States Patent and Trademark Office*